March 2, 1954
J. K. MERTZWEILER
2,671,119
HYDROGENATION OF OXO ALCOHOL BOTTOMS
Filed April 1, 1949
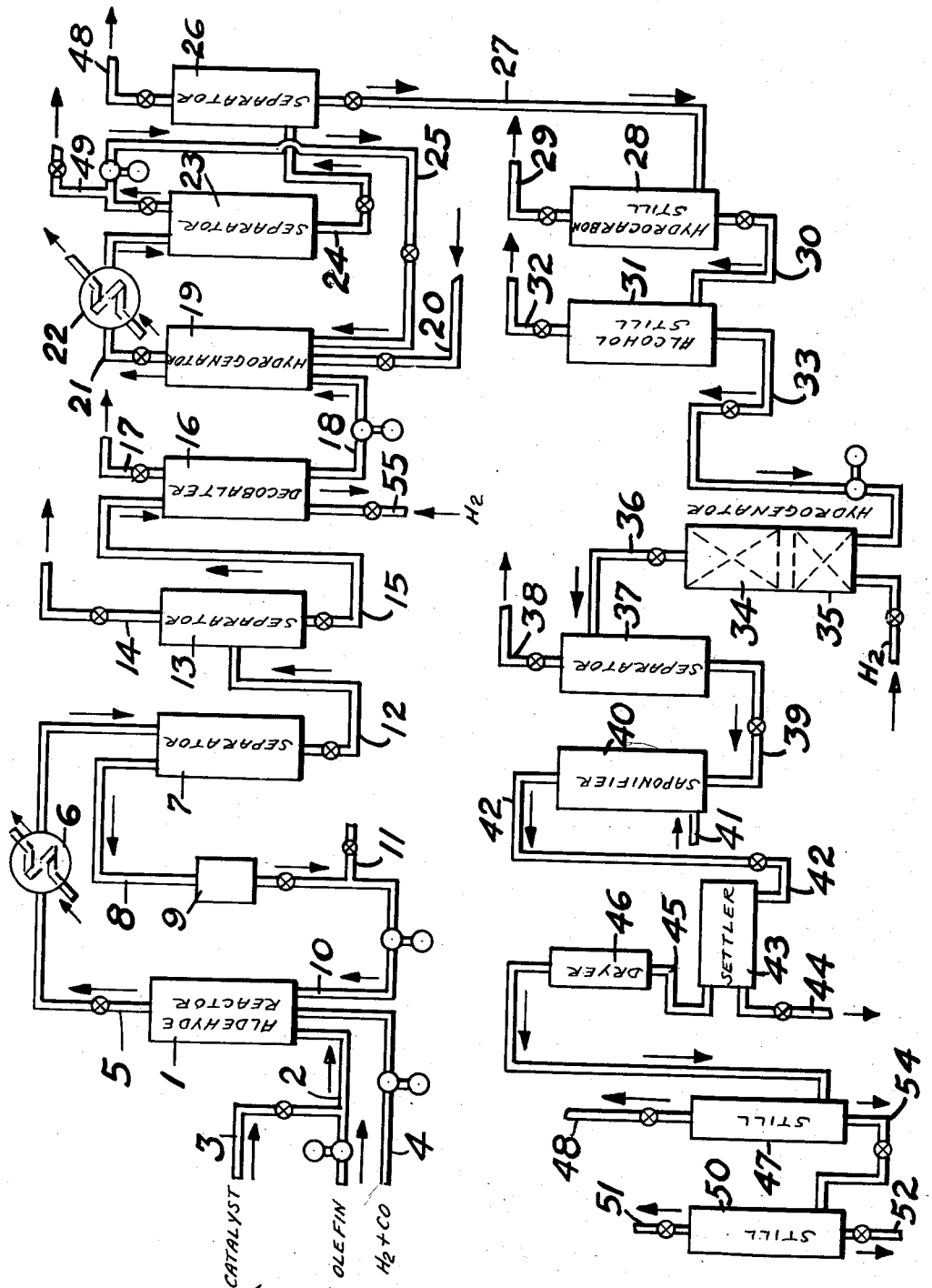
Joseph K. Mertzweiler Inventor
By J Cushman Attorney Patented Mar. 2, 1954

2,671,119

UNITED STATES PATENT OFFICE 2,671,119

HYDROGENATION OF OXO ALCOHOL BOTTOMS

Joseph K. Mertzweiller, Baton Rouge, La., assignor to Standard Oil Development Company, a corporation of Delaware Application April 1, 1949, Serial No. 84,811

8 Claims. (Cl. 260—638)

The present invention relates to the production of oxygenated organic compounds by the catalytic reaction of olefins with hydrogen and carbon monoxide. More specifically, the present invention presents a process for increasing the yield of alcohol that may be obtained at the expense of undesirable secondary reaction products resulting from this process.

It is now well known in the art that oxygenated organic compounds may be synthesized from olefins by reaction of the latter with carbon monoxide and hydrogen in the presence of catalyst containing cobalt or iron in a two stage process. In the first stage, the olefinic material, the catalyst, and proper proportions of CO and $H_2$ are reacted to give a product which consists predominantly of aldehydes, and this material is hydrogenated in the second stage to give the corresponding primary alcohols. The over-all reaction consists essentially of an addition of $H_2$ and CO to the unsaturated linkage and may be formulated as follows:

Stage 1.

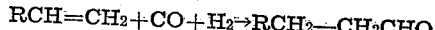

Stage 2.

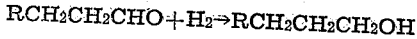

It is thus seen that both the aldehyde and the alcohol formed as a result of the reaction contain one more carbon atom than the olefinic material from which they are derived.

The carbonylation reaction provides a particularly effective method for preparing valuable primary alcohols, which find large markets, particularly as intermediates for detergents and plasticizers. The carbonylation, or "Oxo" process, as it is sometimes called, may be used effectively with long and short chain olefinic compounds, depending on the type alcohol desired. Thus straight and branch chained olefins and diolefins such as propylene, butylene, butadiene, pentene, pentadiene, hexene, heptene, olefin polymers such as di- and tri-isobutylene, hexene and heptene dimers, polypropylenes, and olefinic fractions from the hydrocarbon synthesis process, thermal or catalytic cracking operations, and other sources of hydrocarbon fractions containing such olefins may be used as starting material, depending on the nature of the final product desired. In general, olefins having up to about 18–20 carbon atoms in the molecule are preferred in this reaction.

The catalysts for the first stage of the process are usually employed in the form of salts of the catalytically active metals with high molecular weight fatty acids such as stearic, palmitic, oleic, naphthenic and similar acids. Thus, as suitable catalysts are such organic salts as cobalt stearate, oleate, or napthenate or iron linoleate. These salts are soluble in the liquid olefin feed and may be supplied to the first reaction zone as hydrocarbon solutions or preferably, dissolved in the olefin feed.

The synthesis gas mixture fed to the first stage may consist of any ratio of $H_2$ to CO, but preferably these two gases are present at about 1.0 volume hydrogen per volume CO. The conditions for olefins reacting with $H_2$ and CO vary somewhat in accordance with the nature of the olefin feed, but the reaction is generally conducted at pressures in the range of about 1500 to 4500 p. s. i. g. and at temperatures in the range of about 150° to 450° F.

The quantity of $H_2+CO$ with respect to olefins used may vary within wide ranges, for example, from 1000 to 45,000 cu. ft. of $H_2+CO$ per barrel of olefin fed. In general, about 2,500 to 15,000 cu. ft. of $H_2+CO$ per barrel of olefin fed are employed.

At the end of the first stage, the reaction product and unreacted materials are generally transferred directly to a hydrogenation vessel, where the aldehydes are hydrogenated to alcohols. As hydrogenation catalyst may be employed such materials as supported or unsupported metallic nickel, cobalt, sulfactive catalysts as tungsten, molybdenum and nickel sulfides, alone or in combination, copper chromite, or other carbonyl group-reducing catalysts. In the hydrogenation step, the temperatures are generally between the range of 150°–450° F. and the pressures within the range of about 1500–4500 p. s. i. g.

The final stages of the process involve the separation of the hydrogenated material from the non-hydrogenated residue, and it is to these stages that the present invention applies. As it is performed generally in the art, the aldehydes are hydrogenated under the conditions referred to above, then the crude hydrogenation product is first subjected to a distillation process to distill unreacted hydrocarbons boiling below the alcohol range, and the bottoms from this distillation, comprising the alcohol fraction, is subject to a second distillation stage, where the alcohols are taken overhead. The bottoms from this alcohol distillation have in the past, been considered to be a mixture of polymeric material, such as polymerized aldehydes and ketones, esters, high molecular weight ethers and secondary alcohols and polymerized hydrocarbons, and such bottoms were considered to be of only secondary value as fuel. These bottoms had the effect of cutting down substantially the yield and the alcohol selectivity of the process and increase the difficulty of separating the alcohols from these bottoms.

It is the principal object of the present invention to provide a process whereby the over-all yield and selectivity of alcohols from the carbonylation reaction is substantially increased. It is also the object of the present invention to decrease the quantity of by-products from this reaction, which only are of secondary value as fuel.

The present invention is based upon the discovery that valuable by-products can be obtained by special treatment of the bottoms remaining after removal of the main alcohol product from the total hydrogenated material. These products which include high molecular weight alcohols and ethers, are unavailable by the processes hitherto proposed.

As will be made more clear below, the process of the present invention is especially effective when a sulfactive hydrogenation catalyst is employed in the aldehyde product hydrogenation stage. These catalysts, such as $MoS_2$, on active char, are somewhat less active than nickel or cobalt hydrogenation catalyst, and require somewhat higher temperatures for operation, but they have the great advantage of not being poisoned by sulfur in the feed stream nor by CO resulting from the cobalt carbonyl decomposition step, thus obviating requirements for costly and elaborate purification steps. The present invention relates to the recovery of maximum quantities of alcohol from bottoms from the distillation process following hydrogenation in the presence of such a catalyst.

In accordance with the present invention, the acetal-containing bottoms from the alcohol distillation step are passed to a secondary hydrogenation chamber which preferably contains a more active hydrogenation cataylst than that employed in hydrogenating the first stage aldehydes product and this step is followed by pressure saponification to recover alcohols from esters, and fractionation. Hydrogenation of the heavy material is accomplished without excessive decomposition. The material from the secondary hydrogenation stage after saponification is then treated in the recovery system as shown below to recover further yields of product alcohols and also valuable higher molecular weight ethers. Thus by converting 30% of these bottoms, the overall yield may be increased by about 6% and the overall selectivity by about 8–10%.

The present invention will be best understood from the more detailed description hereinafter, wherein reference will be made to the accompanying drawing, which is a schematic illustration of a system suitable for carrying out a preferred embodiment of the invention.

Referring now to the drawing, an olefinic hydrocarbon having one carbon atom less than the number of carbon atoms in the desired resulting oxygenated compound and containing a dissolved catalyst promoting the reaction of olefinic compounds with carbon monoxide and hydrogen to form oxygenated organic compounds is fed to the lower portion of primary reactor 1 through feed line 2. Any conventional type catalyst such as cobalt stearate, naphthenate, oleate, iron linoleate, etc., may be used. Catalyst make-up dissolved in olefin feed may be added to the main olefin feed line 2 through line 3. The concentrations of catalyst and the proportions of the catalyst-containing feed to the non-catalyst containing feed are such that the concentration of catalyst in the total olefin feed varies between 0.1 to 5.0% by weight, preferably about 1% by weight of catalyst salt to olefin.

Simultaneously, a gas mixture containing hydrogen and carbon monoxide in the approximate ratio of 0.5 to 2.0 volumes of hydrogen per volume of carbon monoxide is supplied through line 4 and is fed to primary reactor 1 along with the olefin to be reacted. Reactor 1 is preferably operated at about 3000 p. s. i. g. and at a temperature of from about 250° to 400° F. The reactor may contain no packing, or may be packed with catalytically inert solid material, such as ceramic Raschig rings, pumice, and the like.

Liquid oxygenated reaction products, unreacted olefins, and synthesis gases are withdrawn from the top of the high pressure reactor 1 and are transferred through line 5 and cooler 6 to high pressure separator 7 where unreacted gases are withdrawn overhead through line 8 scrubbed in scrubber 9 of entrained metal carbonyl catalyst and may be recycled through line 10 to Oxo reactor 1 or used as required in other parts of the system.

Liquid products are withdrawn through line 12 from high pressure separator 7 to low pressure separator 13 where more dissolved metal carbonyl and gases are removed overhead through line 14. From the bottom of low pressure separator 13 the liquid products and unreacted olefins are passed through line 15 to catalyst removal zone 16 which may be a vessel packed with inert solid material of a nature similar to that in primary reactor 1 or may also contain no packing. Hydrogen-comprising gases recovered from another stage of the process may be supplied to catalyst removal zone 16 through line 55 and passed through zone 16 countercurrently to the liquid oxygenated product. Catalyst removal zone 16 is preferably maintained at a temperature of about 200° to 450° F., at which temperature the catalyst which enters zone 16 predominantly in the form of metal carbonyl, such as cobalt carbonyl, dissolved in the liquid product, is decomposed into metal and carbon monoxide. The metal may be deposited on the inert packing within zone 16 or on the walls, while the carbon monoxide may be purged by the hydrogen. A mixture of hydrogen and carbon monoxide may be withdrawn through line 17 and sent to a methanizer or other suitable catalytic unit, wherein carbon monoxide may be converted into methane in any conventional manner, or the purge gas mixture may be used directly in hydrogenator 19 if a CO-insensitive hydrogenation catalyst such as the sulfactive catalysts such as sulfides of molybdenum, tungsten, etc., is employed as hydrogenation catalyst.

Liquid oxygenated products now substantially free of carbonylation catalysts are withdrawn from catalyst removal zone 16 through line 18 and passed to the lower portion of hydrogenation reactor 19. Simultaneously, hydrogen is supplied to reactor 19 through line 20 in proportions sufficient to convert the organic carbonyl compounds in the oxygenated feed into the corresponding alcohols. Hydrogenator 19 may contain a mass of any conventional hydrogenation catalyst, for example, nickel, copper chromite, sulfactive hydrogenation catalysts such as tungsten sulfide, nickel sulfide, molybdenum sulfide, and the like. Depending upon the catalyst, reactor 19 may be operated at pressures ranging from 3000 to 4500 p. s. i. g. and at temperatures of from about 300° to 500° F. and an H₂ rate of from about 5000 to 20,000 normal cu. ft. per bbl. of feed. The catalyst may be in the form of fixed or moving beds, or suspended in the liquid feed.

The products of the hydrogenation reaction and unreacted hydrogen may be withdrawn overhead through line 21 from reactor 19 then through cooler 22 into high pressure separator 23. Unreacted hydrogen may be withdrawn overhead from separator 23 through line 25 and either vented through line 49 or preferably recycled through line 25 to hydrogenation reactor 19. The liquid products are withdrawn from separator 23 through line 24 into low pressure separator 26 where more dissolved gas is flashed overhead through line 48 and liquid products are withdrawn from a lower portion and passed through line 27 to hydrocarbon still 28, wherein are distilled overhead low-boiling products, mostly hydrocarbons boiling below the alcohol product desired. Thus when a C₇ olefin fraction is the feed to the process, generally the product boiling up to 340° F. is removed as a heads cut in hydrocarbon still 28, and this material is withdrawn overhead through line 29 and may be used as a gasoline blending agent if desired. The bottoms from this primary distillation are withdrawn from hydrocarbon still 28 through line 30 and sent to alcohol still 31 where the product alcohols boiling in the desired range may be removed overhead by distillation at atmospheric pressures or under partial vacuum, depending upon the molecular weight of the alcohols.

The bottoms from alcohol still 31 are withdrawn through line 33 and passed into secondary hydrogenation chamber 34. It may be desirable to include a guard catalyst section 35 in the secondary hydrogenation stage to prevent catalyst poisoning by substances likely to deteriorate the more active catalyst in the second hydrogenation stage. The catalyst in chamber 34 preferably contains high concentrations of nickel or copper on supports such as kieselguhr or silica gel and hydrogenation conditions depend upon the activity of the catalyst employed. Thus with a nickel catalyst, temperatures in the range of 300°–400° F., hydrogen pressures of 1500–4500 p. s. i. g. and liquid feed rates of 0.4 to 2.0 v./v./hr. are preferred. With a copper or cobalt catalyst, somewhat higher temperatures may be required.

The use of a guard catalyst is particularly applicable when a sulfactive catalyst has been employed in hydrogenating the aldehydes in reactor 19. As guard catalyst in 35, nickel or copper may be employed.

As a result of this more active hydrogenation, a substantial portion of the acetals present in the bottom from alcohol still 31 are reduced to alcohols and ethers.

After hydrogenation, product is withdrawn through line 36 and passed to high pressure separator 37 wherein liquid hydrogenation product separates and hydrogen is taken off overhead through line 38 for recycle to the system where desired. Product consisting essentially of alcohols, esters, ethers and heavier unreacted material is passed through line 39 to saponification chamber 40. In 40, saponification of the esters present in the bottoms is completed. An aqueous alkali solution such as sodium hydroxide or sodium carbonate from about 5 to 20% concentration is passed to chamber 40 through line 41. Chamber 40 may be any conventional type of saponification vessel equipped with closed or open steam coils and preferably with a means of agitation. The aqueous caustic admitted through line 41 is thoroughly agitated and mixed with the hydrogenation product and the agitated mixture of caustic and product is maintained at a temperature of about 300° to 500° F. and a pressure of about 100 to 400 p. s. i. g. The caustic treated material after saponification is withdrawn through line 42 and passed to settler 43 where the bottom caustic layer is withdrawn after settling through line 44 and either discarded or recycled to the process. The upper layer comprising alcohols, ethers and unsaponifiable material is withdrawn through line 45, passed through dryer 46 and then to the fractionation system. In tower 47 an ether product is taken overhead through line 48. The distillation bottoms are withdrawn through line 54 and passed to still 50 wherein alcohols are taken as a heads cut and withdrawn through line 51 and the unsaponifiable material is withdrawn as bottoms product through line 52 and may be used in any way desired, as for fuel.

The system illustrated in the drawing and in the foregoing description permits of various modifications. Thus the saponification step may be omitted if desired, if the ester content of the bottoms following the second hydrogenation step is low. On the other hand, if hydrogenation in the initial stage is significantly incomplete, it may be desirable to subject the alcohol bottoms to a mild acid hydrolysis reaction.

The invention may be further illustrated by the following examples, in which the bottoms from the distillation of a C₇ olefin fraction which had been subjected to the carbonylation reaction was further subjected to the process of the invention.

EXAMPLE I

First stage.—Aldehyde synthesis

| | |
|---|---|
| Olefin feed | C₇ cut (B. P. 160°–210° F.). |
| Catalyst, wt. per cent in feed | 2.0% cobalt naphthenate. |
| Temperature, °F | 340–350. |
| Pressure, p. s. i. g | 3000. |
| Liquid feed rate, v./v./hr | 0.4. |
| H₂+CO feed rate, s. c. f./B | 5000. |
| H₂/CO ratio, vol | 1.1/1. |
| Olefin conversion, per cent | 75–80. |

Second stage.—Hydrogenation of aldehydes to alcohols

| | |
|---|---|
| Catalyst | 10% MoS₂ on charcoal. |
| Temperature, °F | 450. |
| Liquid feed rate, v./v./hr | 0.5. |
| Hydrogen pressure | 2700–2900. |
| Hydrogen rate, c. f./B | 5000. |
| Distillation summary: | |
| Wt. per cent hydrocarbon+unreacted material (init.–340° F.) | 25.1. |
| Wt. per cent alcohols (340°–370° F.) | 57.5. |
| Wt. per cent bottoms (370° F. up) | 17.4. |
| Alcohol selectivity, per cent | 71. |

A sample of bottoms resulting from the above distillation showed the following analytical inspection, as given in column A.

| | A | B | C |
|---|---|---|---|
| API Gravity | 34.5 | 36.6 | 36.6 |
| Hydroxyl Number (mg. KOH/gm.) | 49 | 110 | 143 |
| Carbonyl Number | 33 | 5 | 3 |
| Saponification Number | 32 | 27 | 2 |
| Acid Number | 1.6 | 1.2 | 0.6 |

One liter of this material was hydrogenated in a shaker autoclave at 350° F. and 2700 p. s. i. g.

with hydrogen (90-92%) for 12 hours in the presence of 10% by volume of nickel hydrogenation catalyst on a kieselguhr support. Column B is the inspection of the material from this hydrogenation stage.

The hydrogenated product was saponified in a stirrer autoclave with an equal volume of 15% caustic solution at 400° F. for 5 hours. The pressure reached 250 p. s. i. g. during the saponification. The saponified product was washed 3 times with hot water and dried over anhydrous sodium sulfate. The product gave the inspection tabulated in column C above.

The saponified product was subjected to distillation at 5 mm. Hg pressure at a 3/1 reflux ratio. It was found that a saturated ether amounting to about 30 volume per cent of the original bottoms and $C_{15}$-$C_{16}$ alcohols also equivalent to about 30% of the bottoms were recovered. In addition, about 10% by volume of $C_8$ alcohols were recovered, thus making an over-all increase in selectivity to $C_8$ alcohols of about 3%, based on a bottoms product from the first hydrogenation stage of 18%.

EXAMPLE II

This example demonstrates the advantage of employing the two-stage hydrogenation process, including hydrogenating the primary hydrogenation stage bottoms with a more active catalyst than employed in the first stage. The feed to the primary hydrogenation process was substantially similar in composition as that in Example I and was prepared under similar conditions.

| Run No. | 1 | 2 | 3 | 4 |
|---|---|---|---|---|
| Primary Hydrogenation: | | | | |
| Operation | Continuous | Continuous | Continuous | Continuous. |
| Catalyst | 10% $MoS_2$ On Charcoal | 10% $MoS_2$ On Charcoal | 10% $MoS_2$ On Charcoal | 10% $MoS_2$ On Charcoal. |
| Avg. Temp., °F | 450 | 450 | 450 | 450-470. |
| Carbonyl No. | 16 | 16 | 16 | 1-4. |
| Bottoms Hydrogenation: | | | | |
| Operation | Batch | Batch | Batch | None. |
| Catalyst | Nickel | 10% $MoS_2$ On Charcoal | 10% $MoS_2$ On Charcoal | |
| Avg. Temp., °F | 350 | 475 | 525 | |
| Carbonyl No. | 5 | 1 | 1 | 1. |
| Hydroxyl No. | 110 | 103 | 52 | 95. |
| Saponification No. | 27 | 18 | 4 | 21. |
| Analysis of Saponified Bottoms: | | | | |
| Carbonyl No. | 2 | 1 | 1 | 1. |
| Hydroxyl No. | 142 | 120 [1] | 54 [1] | 115 [1]. |
| Saponification No. | 2 | 2 [1] | 2 [1] | 2.[1] |

[1] Calculated values.

These data indicate the high yields of valuable higher alcohols recoverable from bottoms product when the product from the first hydrogenation stage is distilled and the bottoms product treated in accordance with the invention, using a more active catalyst in the second hydrogenation stage. Thus Columns 2 and 4 indicate that there is no substantial overall difference in higher molecular weight alcohol obtainable when carrying out the initial hydrogenation to a low carbonyl value of 1-4 and distilling alcohol product overhead, when saponifying the bottoms (column 4), or carrying out the primary hydrogenation less completely, then hydrogenating bottoms to a low carbonyl value (column 2) under the same conditions with a catalyst of the same activity. When, however, a more active catalyst is employed in the bottoms hydrogenation process, a substantial increase in higher molecular weight alcohol product is obtained (column 1).

What is claimed is:

1. An improved process for the production of alcohols from olefins, carbon monoxide and hydrogen which comprises contacting olefins with CO and $H_2$ in the presence of a cobalt carbonylation catalyst under reaction conditions including temperatures in the range of 150° to 450° F. and pressures in the range of 1500 to 4500 pounds to produce oxygenated reaction products comprising organic carbonyl compounds in a reaction zone, passing said oxygenated reaction products to an initial hydrogenation zone, subjecting said products to a hydrogenation reaction under reaction conditions including pressures in the range of 1500 to 4500 pounds and temperatures in the range of about 150° to 500° F. to produce substantial quantities of alcohols having one or more carbon atoms than said olefins, withdrawing hydrogenated and non-hydrogenated organic products from said hydrogenation zone, subjecting said products to an alcohol distillation process in an alcohol distillation zone, withdrawing overhead a product comprising substantially alcohols containing one more carbon atom than the olefin fed to the carbonylation zone, withdrawing distillation bottoms from said distillation zone, subjecting said distillation bottoms to a second hydrogenation reaction in a second hydrogenation zone under conditions more severe than in said initial hydrogenation zone, and recovering valuable alcohols from said hydrogenated material.

2. The process of claim 1 wherein the hydrogenation conditions obtaining in said initial hydrogenation zone comprise pressures in the range of 1500 to 4500 p. s. i. g., temperatures in the range of 400 to 500° F., and feed rates of 0.5 to 2.0 liquid v./v./hr.

3. The process of claim 1 wherein a catalyst of a greater hydrogenation potential is maintained in the second hydrogenation zone than in the initial hydrogenation zone.

4. The process of claim 1 wherein the catalyst in said initial hydrogenation zone is molybdenum sulfide on an active carbon carrier, and wherein the catalyst in said second hydrogenation zone contains a member of the class consisting of nickel, cobalt, copper and molybdenum.

5. The process of claim 4 wherein the catalyst in said second hydrogenation zone comprises cobalt.

6. The process of claim 4 wherein the catalyst in said second hydrogenation zone comprises copper.

7. The process of claim 1 which comprises passing said hydrogenation products from said second hydrogenation zone to a saponification zone, subjecting said products to a saponification reaction under superatmospheric pressures and recovering increased yields of valuable oxygenated products.

8. The process of claim 7 wherein pressures in said saponification zone are in the range of about 100 to 400 p. s. i. g.

JOSEPH K. MERTZWEILER.

References Cited in the file of this patent

UNITED STATES PATENTS

| Number | Name | Date |
|---|---|---|
| 2,091,800 | Adkins et al. | Aug. 31, 1937 |
| 2,094,297 | Joshua et al. | Sept. 28, 1937 |
| 2,112,292 | Jones | Mar. 29, 1938 |
| 2,145,657 | Ipatieff et al. | Jan. 31, 1939 |
| 2,205,184 | Woodhouse | June 18, 1940 |
| 2,326,799 | Pier et al. | Aug. 17, 1943 |
| 2,327,066 | Roelen | Aug. 17, 1943 |
| 2,361,825 | Doumani | Oct. 31, 1944 |
| 2,402,133 | Gresham et al. | June 18, 1946 |
| 2,414,276 | Sensel et al. | Jan. 14, 1947 |
| 2,426,483 | Boucher et al. | Aug. 26, 1947 |
| 2,433,015 | Roland et al. | Dec. 23, 1947 |
| 2,449,470 | Gresham et al. | Sept. 14, 1948 |
| 2,455,713 | Voorhies | Dec. 7, 1948 |
| 2,504,682 | Harlan, Jr. | Apr. 18, 1950 |
| 2,509,878 | Owen | May 30, 1950 |
| 2,525,354 | Hoog et al. | May 30, 1950 |
| 2,595,096 | Parker | Apr. 29, 1952 |

OTHER REFERENCES

National Petroleum News: vol. 37, No. 45, sec. 2, Nov. 7, 1945, pages R-926, R-928, R-930.